(12) United States Patent
Kwak et al.

(10) Patent No.: US 7,668,132 B2
(45) Date of Patent: Feb. 23, 2010

(54) SYSTEM AND METHOD FOR RECEIVED CHANNEL POWER INDICATOR (RCPI) MEASUREMENT

(75) Inventors: Joseph Kwak, Bolingbrook, IL (US);
Stephen G. Dick, Nesconset, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 1182 days.

(21) Appl. No.: 10/799,974

(22) Filed: Mar. 12, 2004

(65) Prior Publication Data
US 2005/0036570 A1 Feb. 17, 2005

Related U.S. Application Data

(60) Provisional application No. 60/454,375, filed on Mar. 12, 2003, provisional application No. 60/465,024, filed on Apr. 23, 2003, provisional application No. 60/507,686, filed on Sep. 30, 2003.

(51) Int. Cl.
*H04W 52/02* (2009.01)

(52) U.S. Cl. ................. 370/328; 370/338; 455/13.4; 455/522

(58) Field of Classification Search ............. 370/328, 370/338, 400, 401; 455/13.4, 151.1, 154.1, 455/522, 41.2, 41.3, 67.11, 67.13, 226.1–226.4
See application file for complete search history.

(56) References Cited

U.S. PATENT DOCUMENTS

| | | | |
|---|---|---|---|
| 6,009,124 A | 12/1999 | Smith et al. | |
| 6,201,954 B1 | 3/2001 | Soliman | |
| 6,266,528 B1 | 7/2001 | Farzaneh | |
| 6,493,541 B1 | 12/2002 | Gunnarsson et al. | |
| 6,675,012 B2* | 1/2004 | Gray | 455/423 |
| 6,940,843 B2* | 9/2005 | Goodall et al. | 370/338 |
| 7,099,647 B2 | 8/2006 | Woo et al. | |
| 7,099,674 B2 | 8/2006 | Diao et al. | |
| 7,133,686 B2* | 11/2006 | Hundal et al. | 455/465 |

(Continued)

FOREIGN PATENT DOCUMENTS

WO 01/93437 12/2001

(Continued)

OTHER PUBLICATIONS

ETSI ES 202 131 V1.1.1 (Jan. 2003) Electromagnetic compatibility and Radio spectrum matters (ERM); Wideband Transmission systems; Data transmission equipment operating in the 2,4 GHz ISM band and using spread spectrum modulation techniques; Specification of Reference Receiver Performance Parameters for Spectrum Planning.

(Continued)

*Primary Examiner*—Pankaj Kumar
*Assistant Examiner*—Duc T Duong
(74) *Attorney, Agent, or Firm*—Volpe and Koenig, P.C.

(57) ABSTRACT

A received channel power indicator (RCPI) value is used as a measure of the received RF power in the selected channel, measured at the antenna connector. This parameter is a measure by the PHY sublayer of the received RF power in the channel measured over the PLCP preamble and over the entire received frame. RCPI is a monotonically increasing, logarithmic function of the received power level defined in dBm.

26 Claims, 6 Drawing Sheets

U.S. PATENT DOCUMENTS

| | | |
|---|---|---|
| 2002/0021687 A1 | 2/2002 | Toki et al. |
| 2002/0031105 A1 | 3/2002 | Zeira et al. |
| 2004/0100898 A1 | 5/2004 | Anim-Appiah et al. |
| 2004/0132411 A1* | 7/2004 | Li .......................... 455/67.13 |
| 2005/0069026 A1 | 3/2005 | Vepsalainen et al. |

FOREIGN PATENT DOCUMENTS

| | | |
|---|---|---|
| WO | 02/071627 | 9/2002 |
| WO | 02/093757 | 11/2002 |
| WO | 03/081817 | 10/2003 |
| WO | 03/088601 | 10/2003 |
| WO | 2004/066511 | 8/2004 |
| WO | 2004/100468 | 11/2004 |

OTHER PUBLICATIONS

"Draft Supplement to Standard for Telecommunications and Information Exchange Between Systems—LAN/MAN Specific Requirements—Part 11: Wireless Medium Access Control (MAC) and Physical Layer (PHY) Specifications: Specification for Radio Resource Measurement." IEEE Standard 802.11k/D0.1, Mar. 2003.

"Draft Supplement to Standard for Telecommunications and Information Exchange Between Systems—LAN/MAN Specific Requirements—Part 11: Wireless Medium Access Control (MAC) and Physical Layer (PHY) Specifications: Specification for Radio Resource Measurement." IEEE Standard 802.11k/D0.2, May 2003.

"Draft Supplement to Standard for Telecommunications and Information Exchange Between Systems—LAN/MAN Specific Requirements—Part 11: Wireless Medium Access Control (MAC) and Physical Layer (PHY) Specifications: Specification for Radio Resource Measurement." IEEE Standard 802.11k/D0.3, Jul. 2003.

"Draft Supplement to Standard for Telecommunications and Information Exchange Between Systems—LAN/MAN Specific Requirements—Part 11: Wireless Medium Access Control (MAC) and Physical Layer (PHY) Specifications: Specification for Radio Resource Measurement." IEEE Standard 802.11k/D0.4, Jul. 2003.

IEEE Wireless LAN Edition: A Compilation Based on IEEE Standard 802.11™-1999 (R2003) and its Amendments.

"Electromagnetic Compatibility and Radio Spectrum Matters (ERM)." ETSI Standards, European Telecommunications Standards Institute, vol. ERM-TG11, No. V111, Jan. 2003, XP 014004558.

* cited by examiner

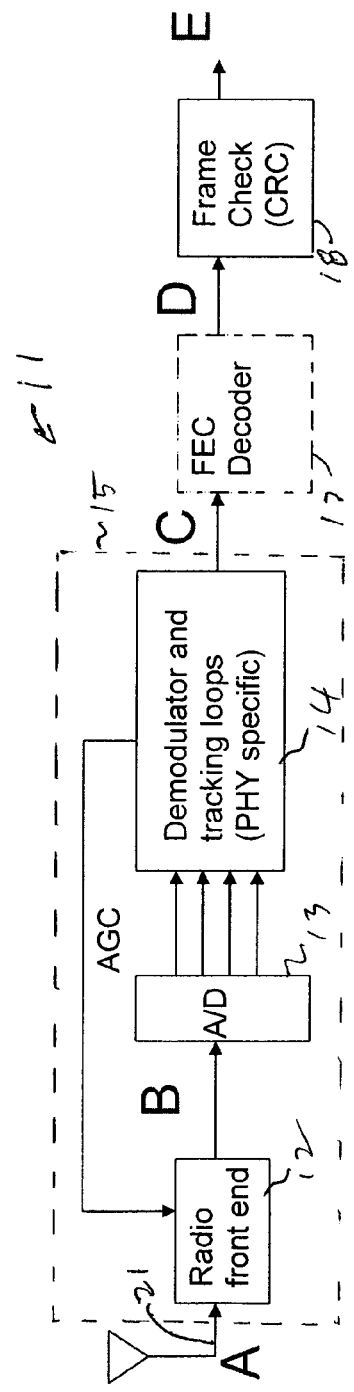
Fig. 1
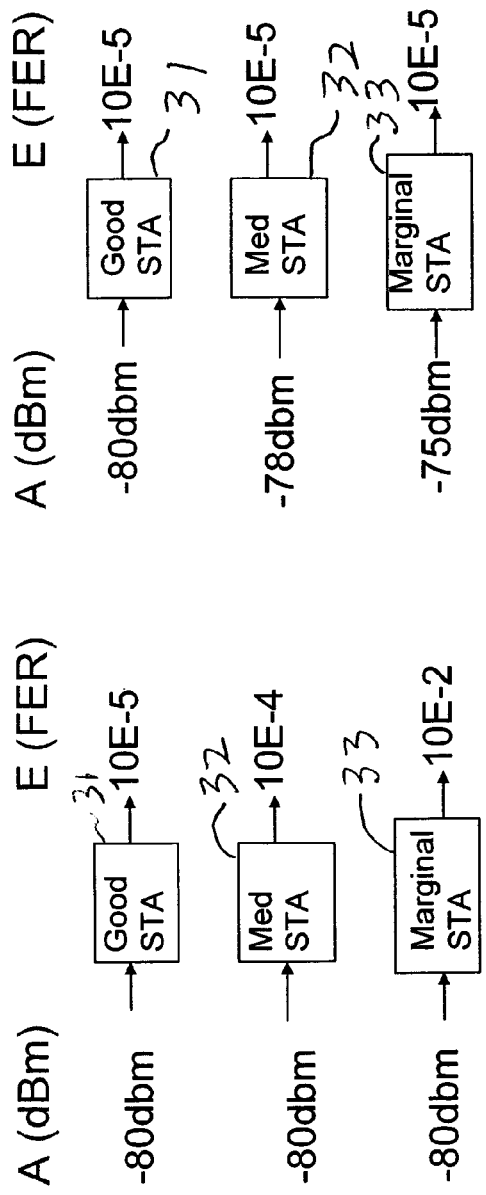
Fig. 2A
Fig. 2B

SYSTEM AND METHOD FOR RECEIVED CHANNEL POWER INDICATOR (RCPI) MEASUREMENT

CROSS REFERENCE TO RELATED APPLICATION(S)

This application claims priority from U.S. provisional application No. 60/454,375 filed Mar. 12, 2003, U.S. provisional application No. 60/465,024 filed Apr. 23, 2003, and U.S. provisional application No. 60/507,686 filed Sep. 30, 2003, all of which are incorporated by reference as if fully set forth.

FIELD OF INVENTION

The present invention relates to wireless communications systems, and more particularly, to a system and method for measuring a received channel power indicator (RCPI).

BACKGROUND

A received signal strength indicator (RSSI) is defined at the antenna input connector, but it is not fully specified, because there are no unit definitions and no performance requirements, such as accuracy or testability. It is not possible to extract meaning from a comparison of RSSIs from different stations and from different channels/physical layers (PHYs) within the same station. RSSI may have limited use for evaluating access point (AP) options within a station, such as a wireless local area network (WLAN) station, and within a given PHY, but is not useful for evaluations between PHYs. RSSI is rescaled between direct sequence spread spectrum (DSSS) and orthogonal frequency division multiplex (OFDM) PHYs. RSSI is clearly not useable by network management for handoff or load balancing. RSSI from one station does not relate to RSSI from any other station. In high interference environments, RSSI is not an adequate indicator of desired signal quality, since it indicates the sum of:

desired signal+noise+interference powers.

SUMMARY

A receiver analyses a signal in order to obtain a received channel power indicator (RCPI) value. The RCPI value is a measure of the received radio frequency (RF) power in the selected channel, measured at the antenna connector. This parameter is a measure by the PHY sublayer of the received RF power in the channel measured over the physical layer convergence protocol (PLCP) preamble and over the entire received frame. RCPI is a monotonically increasing, logarithmic function of the received power level defined in dBm.

BRIEF DESCRIPTION OF THE DRAWINGS

FIG. 1 is a block diagram of a system employing RCPI and PSNI according to the present invention.

FIGS. 2A and 2B are diagrams showing examples of RCPI and PSNI measurements.

DETAILED DESCRIPTION OF THE PREFERRED EMBODIMENTS

Figure 3:
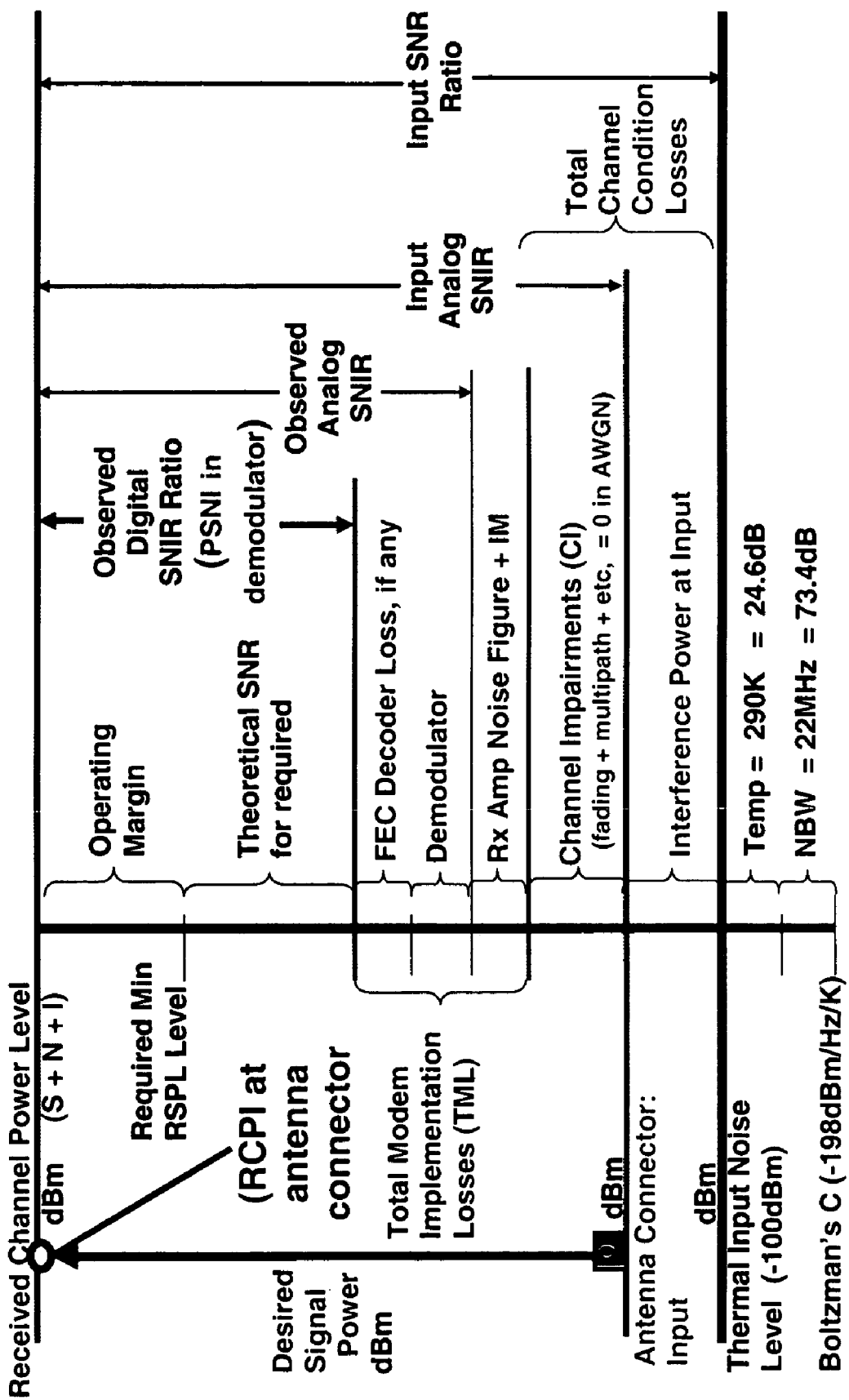
FIG. 3 shows RCPI and PSNI in relation to SNR in the demodulator.

A received channel power indicator (RCPI) disclosed herein provides a quantized, objective input power measure (S+N+I), wherein S is the signal power, N is the noise power, and I is the interference power. A perceived signal to noise indicator (PSNI) provides a value which is a measure of the perceived, post-processing signal-to-noise-plus-interference (S/(N+I)) ratio in the demodulator. The PSNI provides a quantized, comparative measure of received signal quality [observed S/(N+I)] for all channels/rates and among all PHYs and between all stations.

FIG. 1 is a block diagram of a system 11 employing RCPI and PSNI according to the present invention. The system 11 includes a front end 12, an analog-digital converter 13, and a PHY specific demodulator and tracking loops module 14. The front end 12, an analog-digital converter 13, and a PHY specific demodulator and tracking loops module 14 form an AGC section 15. Also shown is an optional FEC decoder 17 and a frame check module 18. The system 11 resolves an incoming signal in a plurality of stages, shown as A through E. The RCPI according to the present invention measures total radio frequency (RF) power A at an antenna input 21. This is the total RF power, measured as RF (S+N+I) for each AP. The output of the front end 12, represented at B, is BB (S+N+I) for each AP, where BB is a power constant used by the AGC 15. The output of the demodulator and tracking loops 14, which also corresponds to the output of the FEC decoder 17, is the bit error rate (BER) for each data rate from each AP. The output of the frame check module 18 is the frame error rate (FER) for each data rate from each AP. The PSNI measures observed S/(N+I) within a demodulator but normalizes measurement for the FER at output E.

FIGS. 2A and 2B are diagrams showing examples of RCPI and PSNI measurements at different stations 31-33. The measurements at FIG. 2A correspond to measured RCPI power at A (FIG. 1). The signal is measured at the same objective SNR for the different stations 31-33. The measurements at FIG. 2B correspond to a measured PNSI quantity, used to determine FER at E (FIG. 1). The signal is measured at the same subjective SNR for the different stations 31-33. Although an accurate S/(N+I) measurement at A is somewhat useful, RF demodulation implementations vary widely from station to station, and the SI(N+1) measurement cannot be used comparatively between stations 31-33 to evaluate delivered signal quality. Accurate FER measurement at output E is an ideal quality measure, but cannot be measured frame by frame. FER can only be accurately measured over a large number of frames, typically several hundred to several thousand frames. Also, FERs are comparable only at the same frame size and data rate.

FIG. 3 shows RCPI and PSNI in relation to SNR in the demodulator. Starting with Boltzman's constant, a thermal input noise level and interference power at input appear at the antenna connector input (21, FIG. 1). The received channel power level is that signal, minus channel impairments, receive amp noise, demodulator loss, FEC decoder loss, and a combination of a theoretical SNR for required reception and operating margin. The level at the antenna connector input is either the input SNR ratio or the input analog SNIR, depending on whether interference power at input is included. The signal after channel impairments, receive amp noise, demodulator loss and FEC decoder loss is the observed digital SNIR, which is the PSNI in the demodulator. The PSNI in the demodulator, when combined with the theoretical SNR for required reception, or the SNR for required reception plus the operating margin, is the received channel power level desired.

Figure 4:
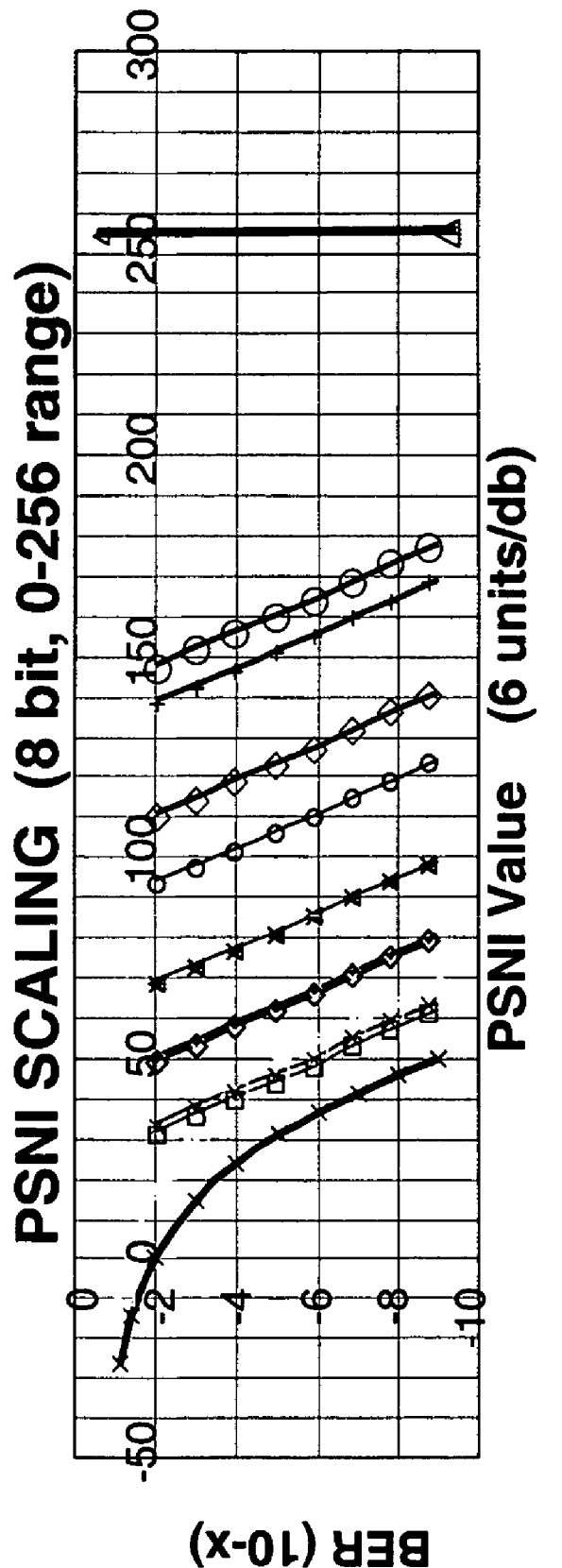
FIG. 4 is a graph showing PSNI value versus BER.
Figure 4:
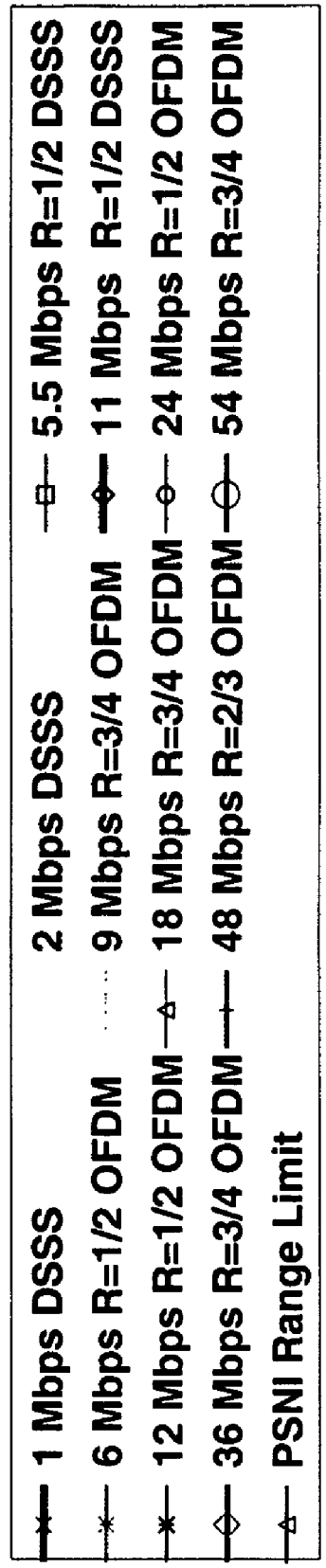

FIG. 4 is a graph showing PSNI value versus BER.

The present invention measures input power RCPI, which is preferably specified in a manner similar to RSSI, for example by an eight (8) bit unsigned value, monotonically increasing with increasing signal strength. In one preferred embodiment, RCPI is logarithmically scaled in dB to measure the total received power within the defined channel bandwidth at the antenna connector A (see FIG. 1), and includes power from the desired signal, noise and interference. RCPI values are quantified in dBm and accuracy is specified across the entire RCPI range. The 221 RCPI levels range from –110 dBm to 0 dBm with 2 units per dB. RCPI accuracy is +/–5 dB across the defined range, equivalent to accuracy specified by TGH for the RPI histogram. RCPI may be used wherever RSSI is specified. The above makes the RCPI value highly desirable and broadly applicable as a frame quality measurement useful for all PHYs and STAs. It is noted that the use of the RCPI provides ease of implementation with modern manufacturers and paves the way for advanced antenna designs.

The RCPI value is a measure of the received RF power in the selected channel, measured at the antenna connector A. This parameter is a measure by the PHY sublayer of the received RF power in the channel measured over the PLCP preamble and over the entire received frame. RCPI is a monotonically increasing, logarithmic function of the received power level defined in dBm. The allowed values for the RCPI parameter are an eight (8) bit value in the range from 0 through 220 (decimal), with indicated values rounded to the nearest 0.5 dB as follows:

0: Power < –110 dBm

1: Power = –109.5 dBm

2: Power = –109.0 dBm

⋮

220: Power > –0 dBm 221-255: reserved

Accuracy for each measurement is +/–5 dB. The measurement assumes a receiver noise equivalent bandwidth of 22 MHz.

The perceived signal to noise plus interference (PSNI) indicator is a demodulator specific, post-processing estimation of observed S/(N+I) and BER/FER. All digital demodulators use tracking loops and complex post-processing to demodulate received symbols. Many internal demodulator metrics are proportional to perceived S/(N+I). Some examples include:

phase shift keying (PSK): baseband phase jitter and received error vector magnitude (EVM)

DSSS: spreading code correlation quality

OFDM: frequency tracking and channel tracking stability

Demodulator internal metrics are available on a frame-by-frame basis. Demodulator metrics proportional to S/(N+I) are available at all data rates. Demodulator internal metrics may be calibrated with respect to actual FER performance to accurately indicate perceived or observed SI(N+I) in a controlled environment with additive white Gaussian noise (AWGN). Such demodulator internal metrics provide fast estimations of S/(N+I) in both interference environments and interference-free (noise only) environments. In one potential implementation of IEEE 802.11, called Task Group K of 802.11 (TGK), it is not necessary to specify which demodulator metrics to use, but it is only necessary to specify how the quantized PSNI indicator relates to S/(N+I) and FER. For example, TGK may specify that for STAs which comply with 802.11k, STAs may report RCPI (or PSNI) in any data field calling for RSSI. A new station management entity (SME) control variable could specify the use of the RSSI field: a) for RCPI, b) for PSNI (perceived signal to noise indication), or c) for RSSI.

One preferred embodiment of the present invention measures output signal quality to obtain PSNI. PSNI is specified like RSSI: an eight-bit unsigned value, monotonically increasing with increasing S/(N+I). PSNI is logarithmically scaled to perceived S/(N+I) which relates directly to FER performance. A PSNI output value is specified for each data rate using FER points: a first point to an "anchor" indicator, and additional points to quantize and scale the indicator slope and the range of values. Accuracy of the PSNI in AWGN is specified to be +/–1 dB for all FER points. PSNI range spans the lower 32 dB portion of the operating range of S/(N+I) to cover high FERs at data rates from 1 to 54 Mbps.

The PSNI indicator is a measure of the perceived, post-processing signal-to-noise-plus-interference (S/(N+I)) ratio in the demodulator. The allowed values for the PSNI parameter are an eight (8) bit value in the range from 0 through 255 (decimal). This parameter is a measure by the PHY sublayer of the perceived signal quality observed after RF downconversion to baseband, and is derived from internal digital signal processing metrics of the demodulator used to receive the current frame. PSNI is measured over the PLCP preamble and over the entire received frame. PSNI is intended to be used in a relative manner, and it is a monotonically increasing, logarithmic function of the observed S/(N+I). PSNI accuracy and range are specified in additive white Gaussian noise (AWGN) at given FERs for each data rate as depicted in Table 1.

Theoretical FEC coding gain assumed in FER calculations is given by:

R=1/2, 5.4 dB gain

R=2/3, 4.7 dB gain

R=3/4, 4.4 dB gain

The PSNI special value of zero indicates an inability to measure PSNI. When PSNI exceeds the high end of the measurable range for a given data rate, the maximum PSNI for that rate is reported.

The data rate/modulation (DRM) adjustments used to offset BER curves are as depicted in Table 2.

Table 3 shows the values obtained for Eb/No, BER, and FER for a PSNI=101. Bit error rates (BERs) vary based on the forward error correction (FEC) coding used at each data rate. FERs vary based on BER and PPDU length. Note that for any station, PSNI will vary only as a result of changing channel conditions or changing received desired signal power level. Note that for efficiency, all stations preferably operate at the highest data rate possible while maintaining an acceptable FER (QoS).

Analyzing PSNI in relation to observed Eb/No, a PSNI value of zero is selected for a post-processing, observed Eb/No (OEbNo) equal to 4.4 dB, for binary phase shift keying (BPSK) at 1 Mbit/s data rate. Eight units (steps) per dB is selected to provide a 32 dB range in an eight-bit PSNI value. For 1 Mbit/s BPSK operation, PSNI=8*[OEbNo–4.4 dB]. In general, for all other data rates and modulations:

$$PSNI=8*[OEbNo-4.4 \text{ dB}+DRMx-CFy]$$  Equation (1)

where DRMx is an S/N adjustment unique for each data rate/demodulation combination. DRM values are calculated in Table 1. CFy is a hardware-specific factor used to account for implementation variances in each FEC decoder in the station. CFy=CGtheo−CGact=actual FEC decoder loss, for each decoder at each specified FER point. CGtheo represents theoretical coding gain and CGact represents actual coding gain. CGtheo values are listed in Table 1. When no FEC decoder is used, CFy=0. Equation 1 is the foundation of the PSNI measurement.

Analyzing PSNI in relation to input signal to noise plus interference ratio (ISNIR) as follows:

SNR=C/N, where Eb=C*Tb, N=No*NBW (noise BW) and DR=1/Tb.

Thus, $$SNR = \frac{Eb/Tb}{No*NBW} = \frac{Eb*DR}{No*NBW} = EbNo*DR/NBW \quad \text{Equation (2)}$$

In db: $SNR=EbNo+DR-NBW$     Equation (3a)

For DR=1 Mbit/s and NBW=22 MHz, $SNR=EbNo+60\text{ dB}-73.4\text{ dB}=EbNo-13.4\text{ dB}$     Equation (3b)

In general, $SNR=EbNo-13.4\text{ dB } DRMx$, with $DRMx$ from Table 1.     Equation (4)

Therefore, $EbNo=SNR+13.4\text{ dB}-DRMx$     Equation (5a)

and $OEbNo=OSNIR+13.4\text{ dB}-DRMx$     Equation (5b)

Employing Equation 1, i.e., PSNI=8*[OEbNo−4.4 dB+DRMx−CFy], and substituting for OEbNo, PSNI=8*[(OSNIR+13.4 dB−DRMx)−4.4 dB+DRMx−CFy], and PSNI=8*[OSNIR+9.0 dB−CFy]. Since $ISNIR=OSNIR+TML+CI,$     Equation (6)

where TML is the modem implementation loss and CI is the sum of all channel impairments, we have $PSNI=8*[(ISNIR-TML-CI)+9.0\text{ dB}-CFy]$     Equation (7)

Analyzing PSNI in relation to BER/FER, PSNI is a direct measure of observed SNIR considering all channel impairments and implementation losses measured at the demodulator. PSNI is specified with respect to output FER, which considers all implementation losses including any FEC decoder implementation loss. Each station measures PSNI using a correction factor CFy to account for the actual coding gain (CGact) of each FEC decoder. Any station measuring PSNI on a frame using FEC will use CFy so that the reported PSNI from all stations is normalized and assumes a theoretical coding gain.

$CFy=CGtheo-CGact$=actual $FEC$ decoder loss.     Equation (8)

Reported PSNI value may be used to estimate OEbNo and BER/FER (QOS) for the reporting station for each data rate.

$OEbNo=(PSNI/8)+4.4\text{ dB}-DRMx$     Equation (9)

For data rates without an FEC decoder, OEbNo is used with the theoretical PSK EbNo curve to estimate BER. For data rates with an FEC decoder, OEbNo is used with the theoretical FEC EbNo curve for PSK to estimate BER. Note that the PSNI relationship to BER is specified only for AWGN. Since the net effect of channel impairments is to degrade OEbNo in the same way as AWGN, PSNI should be an adequate estimator of BER in all channel conditions.

PHY-RXSTART.indication (physical layer-receive start indication)

This is an indication by the PHY to the local medium access control (MAC) entity that the PLCP has received a valid start frame delimiter (SFD) and PLCP Header. The primitive provides the following parameter: PHY-RXSTART.indication (RXVECTOR).

The RXVECTOR represents a list of parameters that the PHY provides the local MAC entity upon receipt of a valid PLCP Header or upon receipt of the last PSDU data bit in the received frame. This vector contains both MAC and MAC management parameters. This primitive is generated by the local PHY entity to the MAC sublayer when the PHY has successfully validated the PLCP header error check (HEC) cyclic redundancy code (CRC) at the start of a new PLCP protocol data unit (PPDU). The effect of receipt of this primitive by the MAC is unspecified.

PHY-RXEND.indication

This primitive is an indication by the PHY to the local MAC entity that the MPDU currently being received is complete. The primitive provides the following parameters: PHY-RXEND.indication (RXERROR, RXVECTOR). The RXERROR parameter can convey one or more of the following values: NoError, FormatViolation, CarrierLost, or UnsupportedRate. A number of error conditions may occur after the PLCP's receive state machine has detected what appears to be a valid preamble and SFD. The following describes the parameter returned for each of those error conditions.

NoError. This value is used to indicate that no error occurred during the receive process in the PLCP.

FormatViolation. This value is used to indicate that the format of the received PPDU was in error.

CarrierLost. This value is used to indicate that during the reception of the incoming protocol data unit (MPDU), the carrier was lost and no further processing of the MPDU can be accomplished.

UnsupportedRate. This value is used to indicate that during the reception of the incoming PPDU, a nonsupported date rate was detected.

The RXVECTOR represents a list of parameters that the PHY provides the local MAC entity upon receipt of a valid PLCP Header or upon receipt of the last PSDU data bit in the received frame. This vector contains both MAC and MAC management parameters. This primitive is generated by the PHY for the local MAC entity to indicate that the receive state machine has completed a reception with or without errors. The effect of receipt of this primitive by the MAC is unspecified.

Receive PLCP

Figure 5:
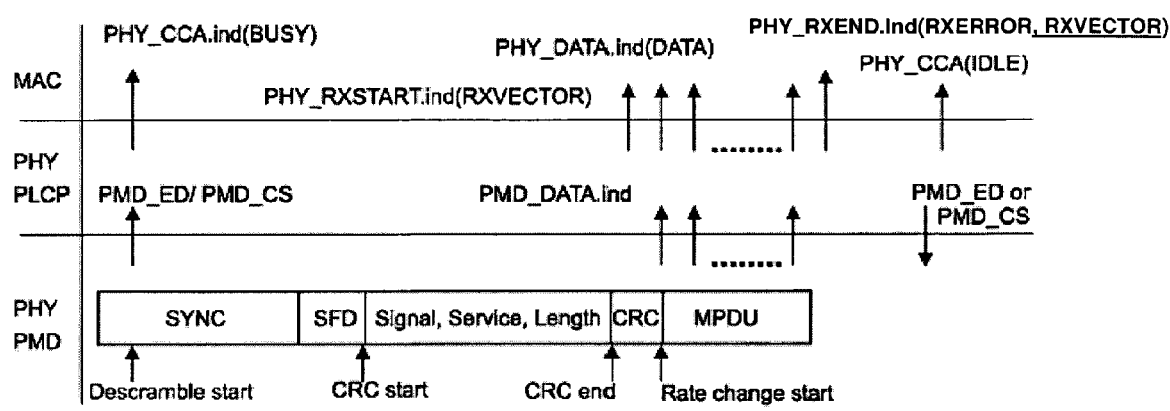
FIG. 5 is a diagram of a first PLCP.

A first embodiment of a receive PLCP is shown in FIG. 5. In order to receive data, PHY-TXSTART.request is disabled so that the PHY entity is in the receive state. Further, through station management via the Physical Layer Management Entity (PLME), the PHY is set to the appropriate channel and the Clear Channel Assessment (CCA) method is chosen. Other receive parameters such as RSSI, RCPI, signal quality (SQ), and indicated data rate are accessed via the PHY-service access point (PHY-SAP), shown in Table 4.

Upon receiving the transmitted energy, according to the selected CCA mode, the physical layer medium-energy detection (PMD_ED) is enabled when the RSSI level crosses the ED_THRESHOLD and/or PMD_Carrier_Sense (PMD_CS) is enabled after code lock is established. These conditions are used to indicate activity to the MAC via PHY- CCA.indicate. PHY-CCA.indicate (BUSY) is issued for energy detection (ED) and/or code lock prior to correct reception of the PLCP frame. The PMD primitives PMD-signal quality (PMD_SQ) and PMD_RSSI are issued to update the RSSI and SQ parameters reported to the MAC.

After PHY-CCA.indicate is issued, the PHY entity begins searching for the Start of Frame Delimiter SFD field. Once the SFD field is detected, CRC-16 processing is initiated and the PLCP IEEE 802.11 SIGNAL, IEEE 802.11 SERVICE and LENGTH fields are received. The CRC-16 frame check sequence (FCS) is processed, and if the CRC-16 FCS check fails, the PHY receiver returns to the RX IDLE state. Should the status of CCA return to the IDLE state during reception prior to completion of the full PLCP processing, the PHY receiver returns to the RX IDLE state.

If the PLCP Header reception is successful (and the SIGNAL field is completely recognizable and supported), a PHY-RXSTART.indicate (RXVECTOR) is issued. The RXVECTOR associated with this primitive includes the SIGNAL field, the SERVICE field, the -MAC Protocol Data Units (MPDU) length in bytes (calculated from the LENGTH field in microseconds), the antenna used for receive (RX_ANTENNA), RSSI, PSNI, and SQ.

PMD_RCPI.indicate (RCPI).

This primitive is the measure of the channel power received by the DSSS PHY measured at the antenna connector, and is generated by the PMD sublayer, provides the received channel power indicator to the PLCP and MAC. The primitive includes the following parameter: PMD_RCPI.indicate (RCPI). The RCPI is a measure of the channel power received by the direct sequence spread spectrum PHY (DSSS PHY) as measured at the antenna connector. RCPI value indications of eight bits (221 levels) are supported. This primitive is generated by the PMD when the DSSS PHY is in the receive state. It is continuously available to the PLCP, which, in turn, provides the parameter to the MAC entity. This parameter is provided to the PLCP layer for information only. The RCPI may be used in conjunction with PSNI to measure input signal quality.

RXVECTOR RCPI

The allowed values for the RCPI parameter are in the range from 0 through 220 and is a measure by the PHY of the received channel power at the antenna connector. RCPI value indications of eight bits (221 levels) are supported. PSNI is measured during the reception of the PLCP preamble and over the entire received frame. The RCPI is measured in the same manner as described above.

Figure 6:
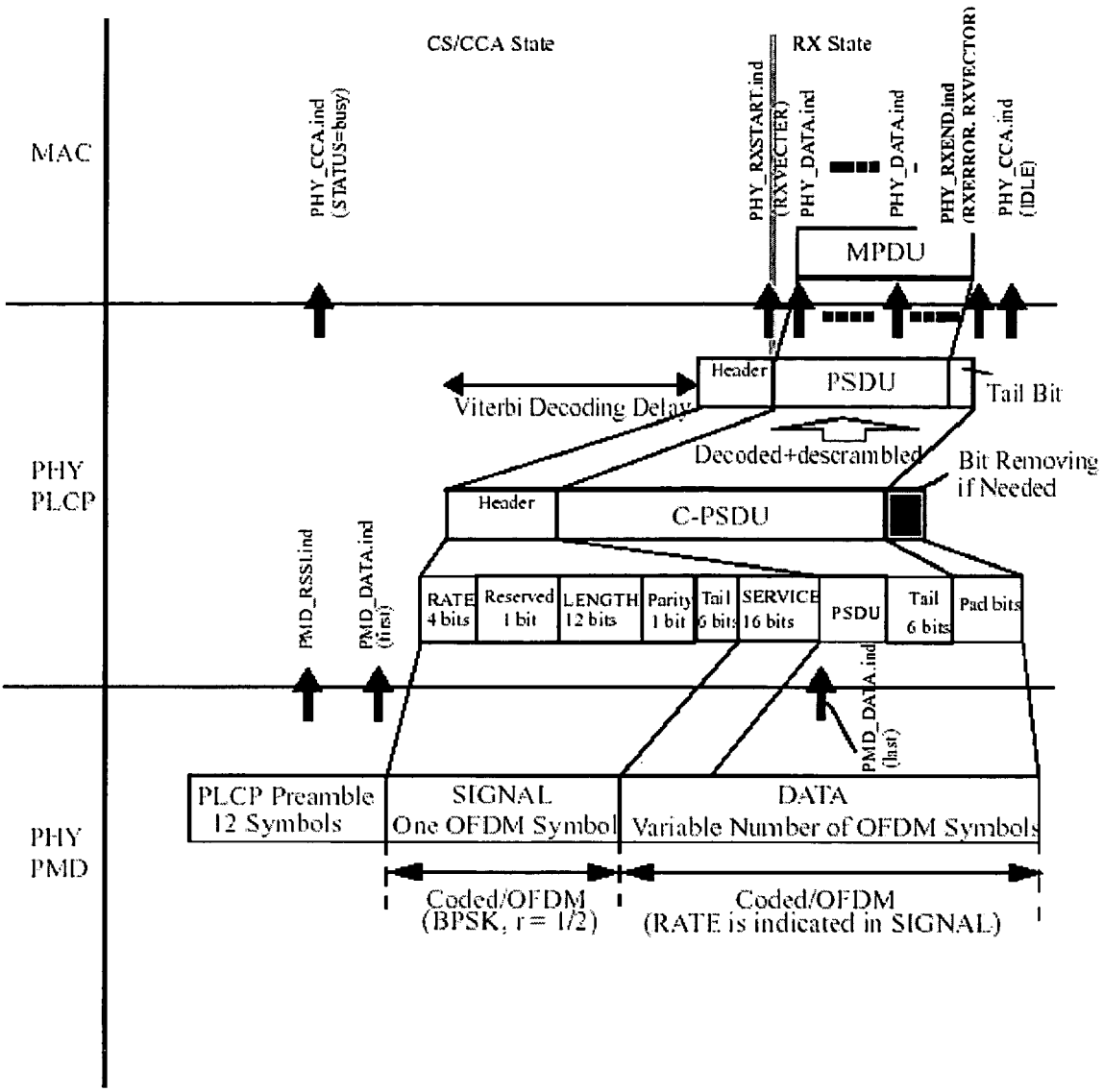
FIG. 6 is a diagram of a second PLCP.

A second embodiment of a receive PLCP is shown in FIG. 6. In order to receive data, PHY-TXSTART.request is disabled so that the PHY entity is in the receive state. Further, through station management (via the PLME) the PHY is set to the appropriate frequency. Other receive parameters, such as RSSI, RCPI, and indicated data rate, are accessed via the PHY-SAP as previously described.

PMD_RCPI.indicate

This primitive, generated by the PMD sublayer, provides the received channel power indicator to the PLCP and MAC entity and provides the following parameter: PMD_RCPI.indicate (RCPI).

The RCPI is a measure of the channel power received by the DSSS PHY as measured at the antenna connector. RCPI value indications of eight bits (221 levels) are supported. This primitive is generated by the PMD when the DSSS PHY is in the receive state. It is continuously available to the PLCP, which, in turn, provides the parameter to the MAC entity. This parameter is provided to the PLCP layer for information only. The RCPI may be used in conjunction with PSNI to measure input signal quality.

Receive PLCP

The receive procedures for receivers configured to receive the mandatory and optional PLCPs, rates, and modulations are described herein. A receiver that supports this High Rate extension of the standard is capable of receiving 5.5 Mbit/s and 11 Mbit/s, in addition to 1 Mbit/s and 2 Mbit/s. If the PHY implements the Short Preamble option, it detects both Short and Long Preamble formats and indicates which type of preamble was received in the RXVECTOR. If the PHY implements the packet binary convolution code (PBCC) Modulation option, it detects either complementary code keying (CCK) or PBCC Modulations, as indicated in the SIGNAL field, and reports the type of modulation used in the RXVECTOR.

The receiver implements the CCA procedure, in which, upon receiving a PPDU, the receiver distinguishes between a long and short header format by the value of the SFD. The receiver demodulates a long PLCP header using BPSK at 1 Mbit/s. The receiver demodulates a short PLCP header using QPSK at 2 Mbit/s. The receiver uses the SIGNAL and SERVICE fields of the PLCP header to determine the data rate and modulation of the PSDU.

Figure 7:
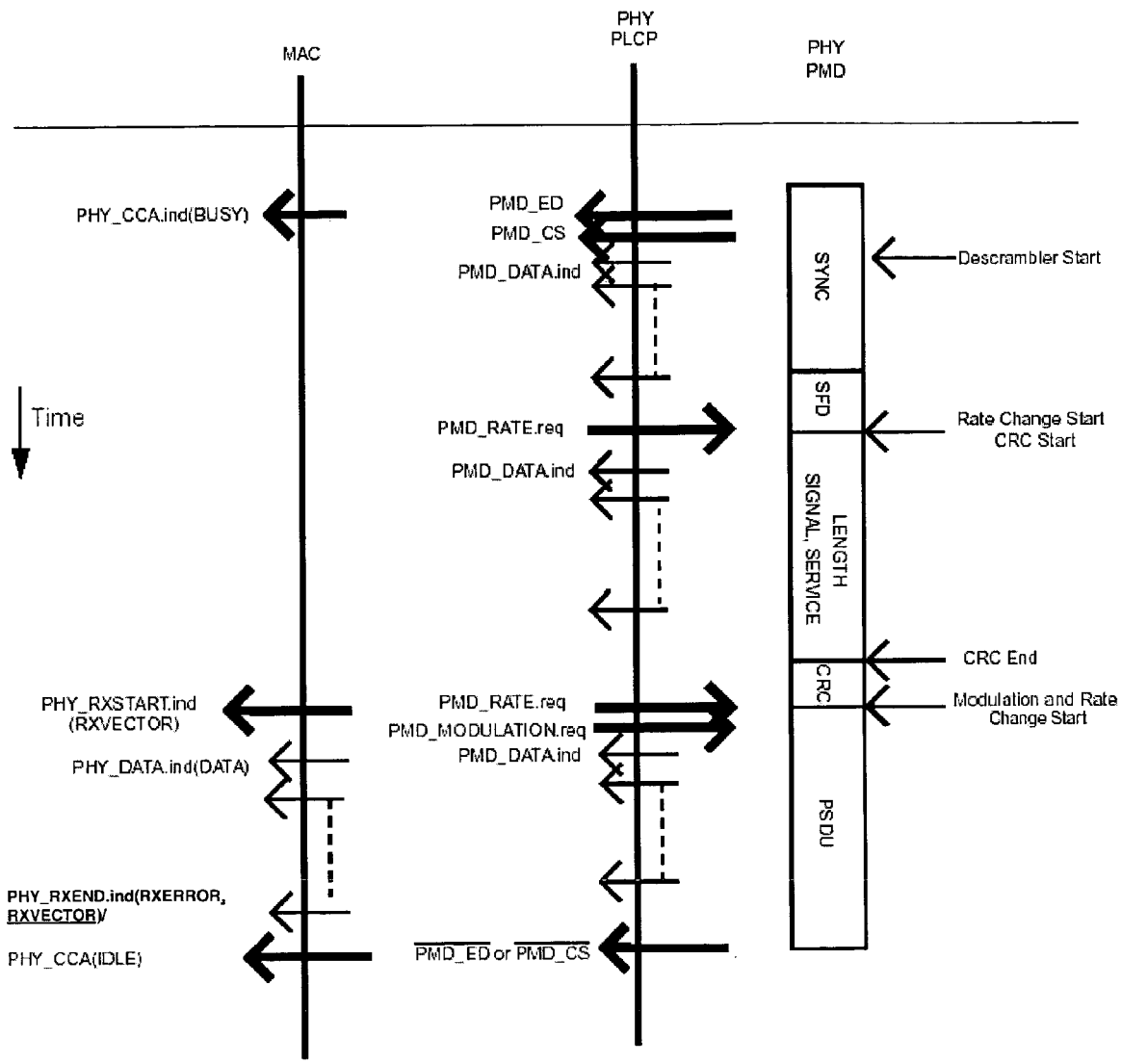
FIG. 7 is a diagram of a third PLCP.

A third embodiment of a receive PLCP is shown in FIG. 7. In order to receive data, the PHY-TXSTART.request is disabled so that the PHY entity is in the receive state. Further, through station management via the PLME, the PHY is set to the appropriate channel and the CCA method chosen. Others receive parameters, such as RSSI, RCPI, SQ, and indicated data rate, are accessed via the PHY-SAP as described previously.

Upon receiving the transmitted energy, according to the selected CCA mode, the PMD_ED is enabled as the RSSI reaches the ED_THRESHOLD, and/or PMD_CS is enabled after code lock is established. These conditions are used to indicate activity to the MAC via PHY-CCA.indicate. PHY-CCA.indicate (BUSY) is issued for ED and/or code lock prior to correct reception of the PLCP header. The PMD primitives, PMD_SQ, PMD_RSSI, PMD_RCPI, are issued to update the RSSI, RCPI, and SQ parameters reported to the MAC.

After PHY-CCA.indicate is issued, the PHY entity begins searching for the SFD field. Once the SFD field is detected, CRC-16 processing is initiated and the PLCP SIGNAL, SERVICE, and LENGTH fields are received. The CRC-16 FCS is processed. If the CRC-16 FCS check fails, the PHY receiver returns to the RX IDLE state. If the status of CCA returns to the IDLE state during reception prior to completion of the full PLCP processing, the PHY receiver returns to the RX IDLE state.

If the PLCP header reception is successful (and the SIGNAL field is completely recognizable and supported), a PHY-RXSTART.indicate (RXVECTOR) is issued. The RXVECTOR associated with this primitive includes: the SIGNAL field; the SERVICE field; the PSDU length in octets (calculated from the LENGTH field in microseconds and the data rate in Mbit/s); RXPREAMBLE_TYPE (which is an enumerated type taking on values SHORTPREAMBLE or LONGPREAMBLE); and the antenna used for receive (RX_ANTENNA), RSSI, RCPI, and SQ.

PMD_PSNI.indicate
following parameter:

TABLE 1

PSNI Accuracy and Range

| Data Rate (Mbit/s) | Mode | FEC Rate | PPDU Length (bytes) | FER | PSNI |
|---|---|---|---|---|---|
| 1 | DSSS | no FEC | 125 | 10% ± 0.2% | 32 ± 8 |
| 2 | DSSS | no FEC | 1250 | 10% ± 0.2% | 66 ± 8 |
| 5.5 | HRDSSS | no FEC | 1250 | 10% ± 0.2% | 101 ± 8 |
| 5.5 | HRDSSS | ½ | 1250 | 10% ± 0.2% | 58 ± 8 |
| 6 | OFDM | ½ | 1250 | 10% ± 0.2% | 61 ± 8 |
| 9 | OFDM | ¾ | 1250 | 10% ± 0.2% | 83 ± 8 |
| 11 | HRDSSS | no FEC | 1250 | 10% ± 0.2% | 125 ± 8 |
| 11 | HRDSSS | ½ | 1250 | 10% ± 0.2% | 82 ± 8 |
| 12 | OFDM | ½ | 1250 | 10% ± 0.2% | 85 ± 8 |
| 18 | OFDM | ¾ | 1250 | 10% ± 0.2% | 107 ± 8 |
| 24 | OFDM | ½ | 1250 | 10% ± 0.2% | 141 ± 8 |
| 36 | OFDM | ¾ | 1250 | 10% ± 0.2% | 163 ± 8 |
| 48 | OFDM | ⅔ | 1250 | 10% ± 0.2% | 206 ± 8 |
| 54 | OFDM | ¾ | 1250 | 10% ± 0.2% | 213 ± 8 |

| Parameter | Associated primitive | Value | Description |
|---|---|---|---|
| RCPI | PMD_RCPI.indicate | 8 bits of RCPI | The RCPI is a measure of the antenna connector channel power received by the High Rate PHY, |

This primitive is generated by the PMD when the High Rate PHY is in the receive state. It is continuously available to the PLCP, which, in turn, provides the parameter to the MAC entity. This parameter is provided to the PLCP layer for information only. The RCPI may be used in conjunction with PSNI to measure input signal quality. The RCPI is measured as described above.

TABLE 2

Data Rate/Modulation (DRM) Adjustments

| Data rate (Mbps) | Mode | Modulation | FEC code rate | Coded rate (Mbps) | Data rate adj. (db) | Modulation adj. (db) | DRM: Total S/N adj.(db) |
|---|---|---|---|---|---|---|---|
| 1 | DSSS | BPSK | none (SF = 11) | 1 | 0 | 0 | 0 |
| 2 | DSSS | QPSK | none (SF = 11) | 2 | 3 | 0 | 3 |
| 5.5 | DSSS 11b | QPSK | none (SF = 16) | 5.5 | 7.4 | 0 | 7.4 |
| 5.5 | DSSS 11b | QPSK | ½ (SF = 2) | 11 | 7.4 | 0 | 7.4 |
| 6 | OFDM | BPSK | ½ | 12 | 7.78 | 0 | 7.78 |
| 9 | OFDM | BPSK | ¾ | 12 | 9.54 | 0 | 9.54 |
| 11 | DSSS 11b | QPSK | ½ (SF = 1) | 11 | 10.41 | 0 | 10.41 |
| 11 | DSSS 11b | QPSK | none (SF = 8) | 11 | 10.41 | 0 | 10.41 |
| 12 | OFDM | QPSK | ½ | 24 | 10.79 | 0 | 10.79 |
| 18 | OFDM | QPSK | ¾ | 24 | 12.55 | 0 | 12.55 |
| 22 | DSSS 11g | 8PSK | ⅔ (SF = 1) | 33 | 13.42 | 0 | 13.42 |
| 24 | OFDM | 16-QAM | ½ | 48 | 13.8 | 3.98 | 17.78 |
| 33 | DSSS 11g | 8PSK | ⅔ (SF = 1) | 49.5 | 15.19 | 0 | 15.19 |
| 36 | OFDM | 16-QAM | ¾ | 48 | 15.56 | 3.98 | 19.54 |
| 48 | OFDM | 64-QAM | ⅔ | 72 | 16.81 | 8.45 | 25.26 |
| 54 | OFDM | 64-QAM | ¾ | 72 | 17.32 | 8.45 | 25.77 |

TABLE 3

| Data Rate (Mbps)/FEC | Eb/No (dB) | BER | PPDU Length | FER |
|---|---|---|---|---|
| 5.5 (none) | 9.6 | 1.00E−05 | 1250 | 1.00E−01 |
| 5.5 (R = ½) | 9.6 | 1.25E−13 | 1250 | 1.00E−09 |
| 6 (R = ½) | 9.2 | 1.25E−12 | 1250 | 1.00E−08 |
| 9 (R = ¾) | 7.5 | 6.00E−09 | 1250 | 4.80E−05 |
| 11 (none) | 6.6 | 1.25E−03 | 10 | 1.00E−01 |
| 11 (R = ½) | 6.6 | 2.00E−09 | 12 | 2.00E−05 |
| 12 (R = ½) | 6.2 | 2.00E−08 | 1250 | 2.00E−04 |
| 18 (R = ¾) | 4.4 | 1.40E−04 | 10 | 1.10E−02 |

TABLE 4

PHY-SAP service primitive parameters

| Parameter | Associated primitive | Value |
|---|---|---|
| DATA | PHY-DATA.request PHY-DATA.indication | Octet value X'00'-X'FF' |
| TXVECTOR | PHY-TXSTART.request | A set of parameters |
| STATUS | PHY-CCA.indication | BUSY, IDLE |
| RXVECTOR | PHY-RXSTART.indication PHY-RXEND.indication | A set of parameters |
| RXERROR | PHY-RXEND.indication | NoError, FormatViolation, Carrier-Lost, UnsupportedRate |

TABLE 5

PMD_SAP peer-to-peer service primitive parameters

| Parameter | Associated primitive | Value |
|---|---|---|
| LENGTH | RXVECTOR, TXVECTOR | 0 to 2E13-1 |

TABLE 5-continued

PMD_SAP peer-to-peer service primitive parameters

| Parameter | Associated primitive | Value |
|---|---|---|
| DATARATE | RXVECTOR, TXVECTOR | 1.2 Mbit/s |
| SERVICE | RXVECTOR, TXVECTOR | 1.2 Mbit/s |
| TXPWR_LEVEL | TXVECTOR | 1.2 Mbit/s |
| TX_ANTENNA | TXVECTOR | 1.2 Mbit/s |
| RSSI | RXVECTOR | 1.2 Mbit/s |
| RCPI | RXVECTOR | 1.2 Mbit/s |
| SQ | RXVECTOR | 1.2 Mbit/s |
| RX_ANTENNA | RXVECTOR | 1.2 Mbit/s |

TABLE 6

PMD_SAP sublayer-to-sublayer service primitives

| Primitive | Request | Indicate | Confirm | Response |
|---|---|---|---|---|
| PMD_TXSTART | X | — | — | — |
| PMD_TXEND | X | X | — | — |
| PMD_ANTSEL | X | — | — | — |
| PMD_TXPWRLEVL | X | — | — | — |
| PMD_RATE | X | X | — | — |
| PMD_RSSI | — | X | — | — |
| PMD_RCPI | — | X | — | — |
| PMD_SQ | — | X | — | — |
| PMD_CS | — | X | — | — |
| PMD_ED | X | X | — | — |

TABLE 7

PMD_SAP service primitive parameters

| Parameter | Associated Primitive | Value |
|---|---|---|
| DATA | PHY-DATA.request PHY-DATA.indicate | Octet value: X'00'-X'FF' |
| TXVECTOR | PHY-DATA.request | A set of parameters |
| RXVECTOR | PHY-DATA.indicate | A set of parameters |
| TX_UNIT | PMD-DATA.request | 1, 0: DBPSK dibit combinations 00, 01, 11, 10: DQPSK |
| RX_UNIT | PMD-DATA.indicate | 1, 0: DBPSK dibit combinations 00, 01, 11, 10: DQPSK |
| RF_STATE | PMD_TXE.request | Receive, Transmit |
| ANT_STATE | PMD-ANTSEL.indicate PMD-ANTSEL.request | 1 to 256 |
| TXPWR_LEVEL | PHY-TXSTART | 0, 1, 2, 3 (max of 4 levels) |
| RATE | PMD-RATE.indicate PMD-RATE.request | X'0A' for 1 Mbit/s DBPSK X'14' for 2 Mbit/s DQPSK |
| RSSI | PMD-RSSI.indicate | 0-8 bits of RSSI |
| RCPI | PMD-RCPI.indicate | 8 bits of RCPI |
| SQ | PMD-SQ.indicate | 0-8 bits of SQ |

TABLE 8

RXVECTOR parameters

| Parameter | Associated primitive | Value |
|---|---|---|
| LENGTH | PHY-RXSTART.indicate | 0 to 4095 |
| RSSI | PHY-RXSTART.indicate (RXVECTOR) | 0 to RSSI maximum |

TABLE 8-continued

RXVECTOR parameters

| Parameter | Associated primitive | Value |
|---|---|---|
| RCPII | PHY-RXSTART.indicate (RXVECTOR) PHY-RXEND.indicate (RXVECTOR) | 0 to 255 |
| DATARATE | PHY-RXSTART.request (RXVECTOR) | 6, 9, 12, 18, 24, 36, 48, 54 |
| SERVICE | PHY-RXSTART.request (RXVECTOR) | Null |

TABLE 9

PMD_SAP sublayer-to-sublayer service primitives

| Primitive | Request | Indicate | Confirm | Response |
|---|---|---|---|---|
| PMD_TXSTART | X | — | — | — |
| PMD_TXEND | X | — | — | — |
| PMD_TXPWRLEVL | X | — | — | — |
| PMD_RATE | X | — | — | — |
| PMD_RSSI | — | X | — | — |
| PMD_RCPI | — | X | — | — |

TABLE 10

List of parameters for the PMD primitives

| Parameter | Associated primitive | Value |
|---|---|---|
| TXD_UNIT | PMD-DATA.request | One(1), Zero(0): one OFDM symbol value |
| RXD_UNIT | PMD-DATA.indicate | One(1), Zero(0): one OFDM symbol value |
| TXPWR_LEVEL | PHY-TXSTART | 1-8 (max of 8 levels) |
| RATE | PMD-RATE.request | 12 Mbit/s (for BPSK) 24 Mbit/s (for QPSK) 48 Mbit/s (for 16-QAM) 72 Mbit/s (for 64-QAM) |
| RSSI | PMD-RSSI.indicate | 0-8 bits of RSSI |
| RCPI | PMD-RCPI.indicate | 8 bits of RCPI |

TABLE 11

Parameter vectors

| Parameter | Associated vector | Value |
|---|---|---|
| DATARATE | RXVECTOR, TXVECTOR | The rate used to transmit the PSDU in Mbit/s. |
| LENGTH | RXVECTOR, TXVECTOR | The length of the PSDU in octets. |
| PREAMBLE_TYPE | RXVECTOR, TXVECTOR | The preamble used for the transmission of this PPDU. This is an enumerated type that can take the value SHORTPREAMBLE or LONGPREAMBLE. |
| MODULATION | RXVECTOR, TXVECTOR | The modulation used for the transmission of this PSDU. This is an integer where 0 means CCK and 1 means PBCC. |
| RX_ANTENNA | RXVECTOR | The antenna used for receive. |
| RSSI | RXVECTOR | 0-8 bits of RSSI |
| RCPI | RXVECTOR | 8 bits of RCPI |
| SQ | RXVECTOR | 0-8 bits of SQ |

TABLE 12

| PMD_SAP sublayer-to-sublayer service primitives | | | | |
|---|---|---|---|---|
| Primitive | Request | Indicate | Confirm | Response |
| PMD_TXSTART | X | — | — | — |
| PMD_TXEND | X | — | — | — |
| PMD_PSNI | — | X | — | — |
| PMD_TXPWRLVL | X | — | — | — |
| PMD_MODULATION | X | X | — | — |
| PMD_PREAMBLE | X | X | — | — |
| PMD_RATE | X | X | — | — |
| PMD_RSSI | — | X | — | — |
| PMD_RCPI | — | X | — | — |
| PMD_SQ | | X | — | — |
| PMD_CS | | X | — | — |
| PMD_ED | X | X | — | — |

What is claimed is:

1. A method for determining a received channel power indicator (RCPI) in a wireless transmit/receive unit (WTRU), the method comprising:
 measuring a radio frequency power of a received ;
 determining an n-bit RCPI parameter from the measured radio frequency power, wherein the RCPI parameter is determined using a monotonically increasing logarithmic function, wherein n is a positive integer; and
 transmitting the determined n-bit RCPI parameter.

2. The method of claim 1 wherein the radio frequency power of the received signal is measured by a physical (PHY) sublayer.

3. The method of claim 2 wherein a direct sequence spread spectrum (DSSS) PHY sublayer is used as the PHY sublayer.

4. The method of claim 2 wherein an orthogonal frequency division multiplex (OFDM) PHY sublayer is used as the PHY sublayer.

5. The method of claim 1 wherein the measured radio frequency power of the received signal is defined in dBm.

6. The method of claim 5 wherein the measured radio frequency power of the received signal is rounded to a nearest 0.5 dB.

7. The method of claim 5 wherein the measured radio frequency power of the received signal is measured to an accuracy of ±5 dB.

8. The method of claim 1 wherein the n-bit RCPI parameter is an 8 RCPI parameter.

9. The method of claim 1 wherein the n-bit RCPI parameter is determined as a scalar value in a range of 0 through 220.

10. The method of claim 9 wherein the range used for the scalar value includes a 0 scalar value that corresponds to a power less than −110 dBm and a 220 scalar value that corresponds to a power greater than −0 dBm.

11. The method of claim 1, wherein the radio frequency power of the received signal is measured over an entire frame.

12. The method of claim 11, wherein the entire frame includes a Physical Layer Convergence Protocol (PLCP) preamble.

13. The method of claim 1 wherein the radio frequency power of the received signal is measured at an antenna connector.

14. A wireless transmit/receive unit (WTRU) comprising:
 a processor configured to:
  measure a radio frequency power of a received signal;
  determine an n-bit received channel power indicator (RCPI) parameter from the measured radio frequency power, wherein the RCPI parameter is determined using a monotonically increasing logarithmic function, where n is a positive integer; and
 a transmitter configured to transmit the determined n-bit RCPI parameter.

15. The WTRU of claim 14 wherein the radio frequency power of the received signal is measured by a physical (PHY) sublayer.

16. The WTRU of claim 15 wherein the PHY sublayer is a direct sequence spread spectrum (DSSS) PHY sublayer.

17. The WTRU of claim 15 wherein the PHY sublayer is an orthogonal frequency division multiplex (OFDM) PHY sublayer.

18. The WTRU of claim 14 wherein the measured radio frequency power of the received signal is defined in dBm.

19. The WTRU of claim 18 wherein the measured radio frequency power of the received signal is rounded to a nearest 0.5 dB.

20. The WTRU of claim 19 wherein the range used for the scalar value includes a 0 scalar value that corresponds to a power less than −110 dBm and a 220 scalar value that corresponds to a power greater than −0 dBm.

21. The WTRU of claim 18 wherein the measured radio frequency power of the received signal is measured to an accuracy of ±5 dB.

22. The WTRU of claim 14 wherein the n-bit RCPI parameter is an 8 bit RCPI parameter.

23. The WTRU of claim 14 wherein the n-bit RCPI parameter is a scalar value in a range of 0 through 220.

24. The WTRU of claim 14, wherein the radio frequency power of the received signal is measured over an entire frame.

25. The WTRU of claim 24, wherein the entire frame includes a Physical Layer Convergence Protocol (PLCP) preamble.

26. The WTRU of claim 14 wherein the radio frequency power of the received signal is measured at an antenna connector.

* * * * *

UNITED STATES PATENT AND TRADEMARK OFFICE
CERTIFICATE OF CORRECTION

PATENT NO.      : 7,668,132 B2                                   Page 1 of 1
APPLICATION NO. : 10/799974
DATED           : February 23, 2010
INVENTOR(S)     : Kwak et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1510 days.

Signed and Sealed this

Seventh Day of December, 2010

David J. Kappos
*Director of the United States Patent and Trademark Office*